(12) United States Patent
Baillif et al.

(10) Patent No.: US 7,020,677 B1
(45) Date of Patent: Mar. 28, 2006

(54) METHOD FOR ASSISTING THE ADMINISTRATION OF A DISTRIBUTED APPLICATION BASED ON A BINARY CONFIGURATION FILE IN A COMPUTER SYSTEM

(75) Inventors: Christian Baillif, Bourg la Reine (FR); Mama Saidou Dia, Chatenay Malabry (FR)

(73) Assignee: Bull, S.A., Louveciennes (FR)

( * ) Notice: Subject to any disclaimer, the term of this patent is extended or adjusted under 35 U.S.C. 154(b) by 0 days.

(21) Appl. No.: 09/380,250

(22) PCT Filed: Dec. 28, 1998

(86) PCT No.: PCT/FR98/02886

§ 371 (c)(1),
(2), (4) Date: Aug. 30, 1999

(87) PCT Pub. No.: WO99/35573

PCT Pub. Date: Jul. 15, 1999

(30) Foreign Application Priority Data

Dec. 30, 1997 (FR) .................................. 97 16699

(51) Int. Cl.
*G06F 15/16* (2006.01)

(52) U.S. Cl. ...................... 709/201; 709/220; 718/101; 719/318

(58) Field of Classification Search ................ 709/101, 709/224, 227, 100, 200, 400, 201, 208, 220; 707/201; 718/101; 719/318
See application file for complete search history.

(56) References Cited

U.S. PATENT DOCUMENTS

| 5,396,600 | A | * | 3/1995 | Thompson et al. ........... 705/28 |
| 5,420,981 | A | * | 5/1995 | Ivie et al. .................... 709/227 |
| 5,457,797 | A | * | 10/1995 | Butterworth et al. ....... 719/320 |
| 5,557,735 | A |   | 9/1996 | Pinkston, II et al. |
| 5,561,797 | A | * | 10/1996 | Gilles et al. .................... 707/8 |
| 5,802,291 | A | * | 9/1998 | Balick et al. ............... 709/202 |

(Continued)

OTHER PUBLICATIONS

Bernstein P A: "Transaction Processing Monitors" Communications of the Assoc. for Computing Machinery, vol. 33, No. 11, Nov. 1, 1990 pp. 75-86, XP000110643.

(Continued)

*Primary Examiner*—Meng-Al T. An
*Assistant Examiner*—Lilian Vo
(74) *Attorney, Agent, or Firm*—Miles & Stockbridge P.C.; Edward J. Kondracki

(57) ABSTRACT

The present invention relates to a process for assisting in the administration of a distributed application of a transaction processing manager based on a binary configuration file (TUXCONFIG), characterized in that said process comprises:

decompiling the active configuration file of the master machine (Mm),
retrieving information from the decompiled configuration file of the master machine, and
checking the consistency of said application running on said given machine.

Information related to at least one listener module is displayed and includes at least the name of the application, the logical name of the machine (LMID) on which the application is run, the identification of the user (UID) of said application, the address used by the listener module (NLSADDR), the access path to the network of the application, and the access path to a log file of said listener module (LLFPN). If the tlog file containing information on the application running on a given machine does not exist, the file is automatically generated in order to be able to used the file during the next startup of the listener modules.

15 Claims, 7 Drawing Sheets

U.S. PATENT DOCUMENTS

| | | | |
|---|---|---|---|
| 5,857,100 A * | 1/1999 | Phillips et al. | 709/101 |
| 5,875,291 A * | 2/1999 | Fox | 714/15 |
| 5,974,135 A * | 10/1999 | Breneman et al. | 379/265.04 |
| 5,978,813 A * | 11/1999 | Foltz et al. | 707/201 |
| 5,996,012 A * | 11/1999 | Jarriel | 709/226 |
| 6,003,085 A * | 12/1999 | Ratner et al. | 709/227 |
| 6,009,274 A * | 12/1999 | Fletcher et al. | 717/173 |
| 6,021,438 A * | 2/2000 | Duvvoori et al. | 709/224 |
| 6,064,813 A * | 5/2000 | Sitbon et al. | 717/100 |
| 6,122,664 A * | 9/2000 | Boukobza et al. | 709/224 |
| 6,144,993 A * | 11/2000 | Fukunaga et al. | 709/208 |
| 6,223,187 B1 * | 4/2001 | Boothby et al. | 707/201 |
| 6,308,207 B1 * | 10/2001 | Tseng et al. | 709/224 |

OTHER PUBLICATIONS

Gupta P: HP Encina/7000: Middleware for Constructing Transaction Processing Applications: Hewlett-Packard Journal, vol. 46, No. 6, Dec. 1, 1995 pp. 61-74, XP000581127.

* cited by examiner

METHOD FOR ASSISTING THE ADMINISTRATION OF A DISTRIBUTED APPLICATION BASED ON A BINARY CONFIGURATION FILE IN A COMPUTER SYSTEM

BACKGROUND OF THE INVENTION

1. Field of the Invention

The present invention relates to a process for assisting in the administration of a distributed application based on a binary configuration file in a computer system. This process for assisting in the administration can especially be applied to a transaction processing manager like the one marketed under the name "Tuxedo."

2. Description of Related Art

The "Tuxedo" application allows different software programs that do not recognize one another, but that use a certain protocol, to work together.

Generally, the "Tuxedo" application is a distributed application, i.e., an application that runs on several machines at the same time. A "machine" is the node of the network in which the servers of the "Tuxedo" application run, and the "master machine" is the one that controls the "Tuxedo" application. FIG. 8 illustrates the operation of the "Tuxedo" application. When the "Tuxedo" application is started up, the binary configuration file (TUXCONFIG) is loaded from the disk in the bulletin board (BB) of the master machine (Mm). The bulletin board (BB) represents a set of data structures located in the shared memory and containing information on the transactions, the servers, the services and the clients belonging to the "Tuxedo" application. During the startup of the master machine (Mm), the bulletin board (BB) is loaded into the memory of the master machine (Mm) from a binary "Tuxedo" configuration file (TUXCONFIG). Then, it is distributed to the slave machines (Me) by the master process of the application, called the distinguished bulletin board liaison (DBBL). Each machine of the application is under the control of a process called a bulletin board liaison (BBL). The distinguished bulletin board liaison DBBL is an administrative process that communicates with the bulletin board liaison (BBL) processes ordinate the updates of the bulletin board (BB). The bulletin board liaison BBL is an administrative process that is responsible for maintaining an updated copy of the bulletin board (BB) in its own slave machine (Me). Each slave machine (Me) is under the control of a bulletin board liaison process BBL, implicitly defined by "Tuxedo."

The bridge (BRIDGE) (1) is a process for managing communications between the servers of the "Tuxedo" application. Each machine is provided with a bridge implicitly defined by "Tuxedo." The server TMS (Transaction Manager Server) is a process that manages a validation protocol and recovery for transactions executed by several application servers. The listener module (tlisten, 3) is a process that manages the messages intended for the "Tuxedo" application in a given machine before the bridge process (BRIDGE) of this machine has been started. A listener module allows a machine to receive information coming from other machines. A listener module is required in each machine when the application is distributed.

The "Tuxedo" application is created by the construction of a binary configuration file that defines the architecture of said application (FIG. 7). During the creation of the configuration file, an administrator defines the services (Se) provided by the application and assigns them to application servers (Sr). The administrator then defines groups (G) and assigns a set of servers (Sr). Finally, the administrator assigns groups (G) to a machine (M). Each application must be given a minimum of one group (G), one service (Se) and one server (Sr). A machine (M) can manage several groups (G).

After the creation of a "Tuxedo" application, this application must be administered. The object of the invention is to create a system to assist in the administration of the "Tuxedo" application. The main steps involved in the administration of a "Tuxedo" application consist of:

a step for loading the binary configuration file of the "Tuxedo" application;

a step for starting listener modules when the "Tuxedo" application is a distributed application;

a step for starting the Tuxedo application;

a step for controlling the application. This consists of displaying information and, if necessary, performing the required corrections;

a step for stopping the application; and possibly a step for stopping the listener modules when they have been started.

The administration of a distributed application can quickly become very complex. In fact, before this administration can begin, the operator must activate a listener module in each slave machine on which he wishes to act. To do this, the administrator must first consult a file containing information on the activation of the listener modules. This file is generally stored, in a place that must be remembered, in each machine. Then, with the aid of this information, the operator must activate the listener module of each machine, one by one. Thus, if the application involves ten machines, the operator must activate the listener module in each of the ten machines, then at the end of the application, deactivate the ten listener modules. This repetitive operation is long and tedious.

Each administrator has his own solution for performing these tasks. The most common solution is to store in each machine, in a place that must be remembered, scripts for activating the listener modules, and to keep a paper copy of the configuration file. The administrator must make sure that the information is up to date at all times. Each time the configuration changes, he must not forget to print out a paper copy of the configuration file and update the scripts in the slave machines.

Moreover, each time the operator wants to act on an element of an application, he must be able to quickly and accurately identify a given resource, such as for example, when stopping the server "serve1", belonging to the group "group1" in the machine "mach1".

When the number of applications increases, these manual operations are the source of numerous errors.

SUMMARY OF THE INVENTION

The object of the present invention is to eliminate the drawbacks of the prior art by offering a process for assisting in the administration of a distributed application of a transaction processing manager, based on the binary configuration file of the application, characterized in that said process comprises:

a step for decompiling the active configuration file of the master machine, a step for retrieving information in the decompiled configuration file of the master machine (Mm), a step for checking the consistency of said application running on a given machine.

According to another characteristic, said process makes it possible to manage at least one listener module (3) of any machine of the application from another machine.

According to another characteristic, the information related to said distributed application is extracted directly from the active configuration file of the master machine.

According to another characteristic, the step for checking the consistency of said application consists of a comparison between information obtained from the configuration file of the master machine and information obtained from said current application running on another machine.

According to another characteristic, said management of the listener modules makes it possible to start and stop at least one listener module, to display information related to at least one listener module, to change the log of at least one listener module, to check the script of at least one listener module, and to update the script of at least one listener module.

According to another characteristic, an administrator on any machine of the network can start or stop a listener module running on another machine of the network.

According to another characteristic, said process makes it possible to activate several listener modules in a single operation.

According to another characteristic, a graphical interface facilitates the management of the listener modules.

According to another characteristic, said graphical interface makes it possible to display the structure of said application and to select a desired value from a list of values for the current configuration.

According to another characteristic, when the file containing information on said application running on a given machine (tlog) does not exist, the process generates it automatically in order to be able to use it during the next startup of the listener modules (3).

According to another characteristic, said displayed information related to at least one listener module comprises at least the name of said application, the logical name of the machine (LMID) on which said application is run, the identification of the administrator (UID) of said application, the address used by the listener module (NLSADDR), the access path to the network of said application, and the access path to the log file of said listener module (LLFPN).

BRIEF DESCRIPTION OF THE DRAWINGS

Other characteristic and advantages of the present invention will emerge more clearly with the reading of the following description given in reference to the attached drawings, in which.

DESCRIPTION OF THE PREFERRED EMBODIMENTS

Figure 1:
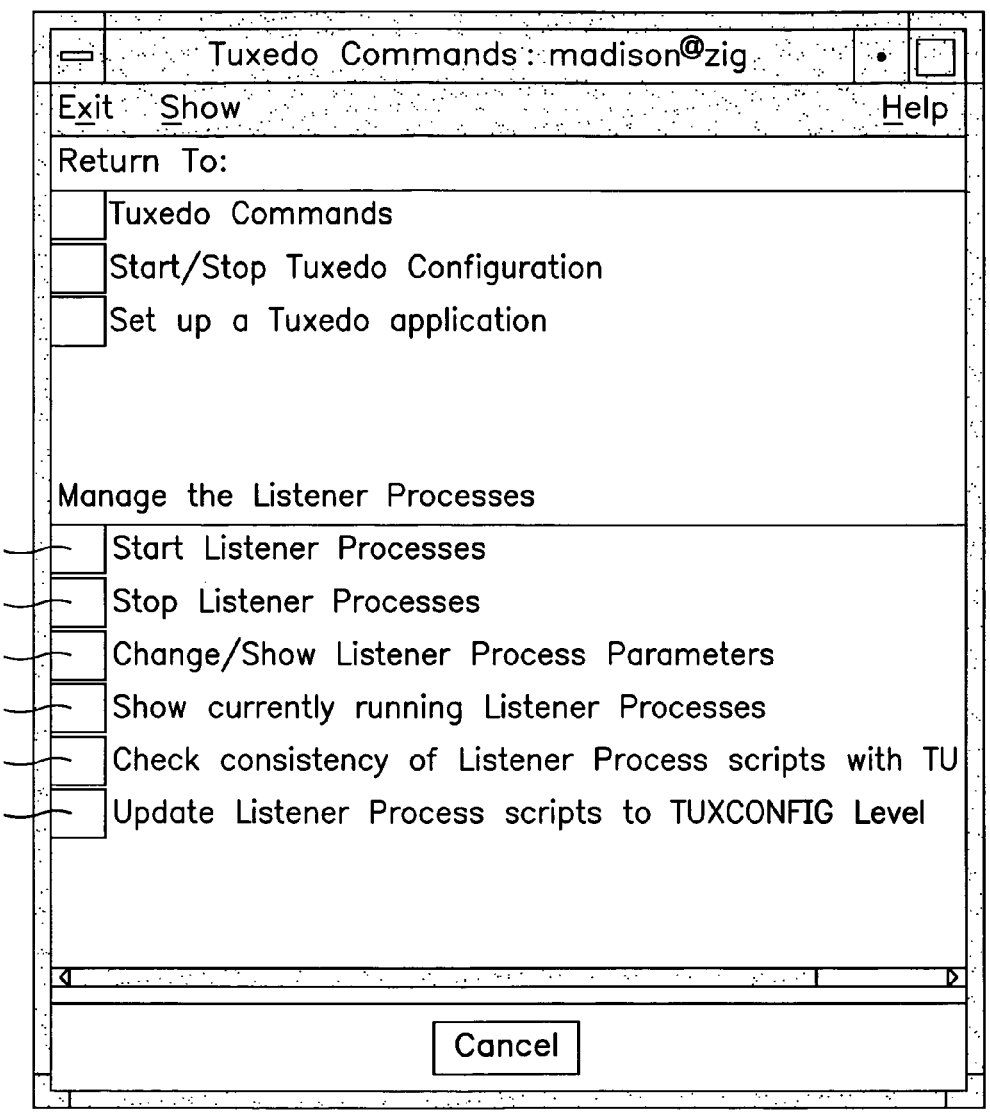
FIG. 1 represents a window of the graphical interface that offers access to the main commands for managing the modules.

The following is a non-limiting exemplary specification of a configuration file. This configuration file, presented in Appendix 1, relates to the "Tuxedo" application. It is divided into seven sections (resources, machines, groups, servers, services, routing and network).

The resources section contains general information related to the application. This information is common to all the machines and is constituted by the following parameters:

IPCKEY, which represents a digital key identifying the shared memory segment in which the application structures are stored. Thanks to this digital key, a given application cannot be in conflict with other applications;

MASTER, which represents the master machine;

DOMAINID, which represents the domain of the application;

MAXACCESSERS, which defines the maximum number of people that can access the application;

MAXSERVERS, which defines the maximum number of servers that can be connected with the application;

MAXSERVICES, which defines the maximum number of services that can be connected with the application;

OPTIONS, which makes it possible to indicate whether the application is running in a local area network;

MODEL, which makes it possible to indicate whether the application is or is not distributed.

The machines section contains information on each machine (puce, trifide, zig, orage) of the network. This information is constituted by the following parameters:

LMID (Logical Machine ID), which defines the logical name of the machine, i.e., the name used internally by the application in place of the network name;

TUXDIR, which specifies the access path to the installation directory of the "Tuxedo" software;

APPDIR, which specifies the access path to the application servers, i.e., the path leading to the programs of the application (for example, the programs related to the "TUXEDO" application);

TUXCONFIG, which specifies the absolute access path to the binary configuration file TUXCONFIG, which contains information on the application;

ENVFILE, which specifies the access path to the file containing the environment variables for the servers and the clients of a given machine;

ULOGPFX, which specifies the access path to the file "ULOG", which contains information on the history of the application.

The groups section is the section in which each machine is assigned to a group. In the example of Appendix 1, there are four groups. A group is a set of servers that provide related services. In the simplest case, a group is constituted by only one server. All the servers of a group must run on the same machine. An application must comprise at least one group.

The servers section provides information on each server. A server is a module that provides services. In the example of Appendix 1, there are four servers. In the simplest case, a server provides only one service. An application must be provided with at least one server. The server section provides the following information:

SRVGRP, which defines the group with which the server is affiliated;

SRVID, which defines the identification number of the server;

MIN, MAX, which indicates the maximum and minimum occurrences of this server;

RQADDR, which defines the name of the message queue used for the sending of a message;

in REPLYQ, the administrator decides on the existence of a response queue;

CLOPT, which indicates the startup options of the server (available services, priority, etc.).

In the services section, the administrator can specify the services. A service is a set of functions that respond to service requests issued by end users of the application. If the administrator wishes to indicate optional values that are different from the default values, the services must necessarily be defined.

Figure 4:
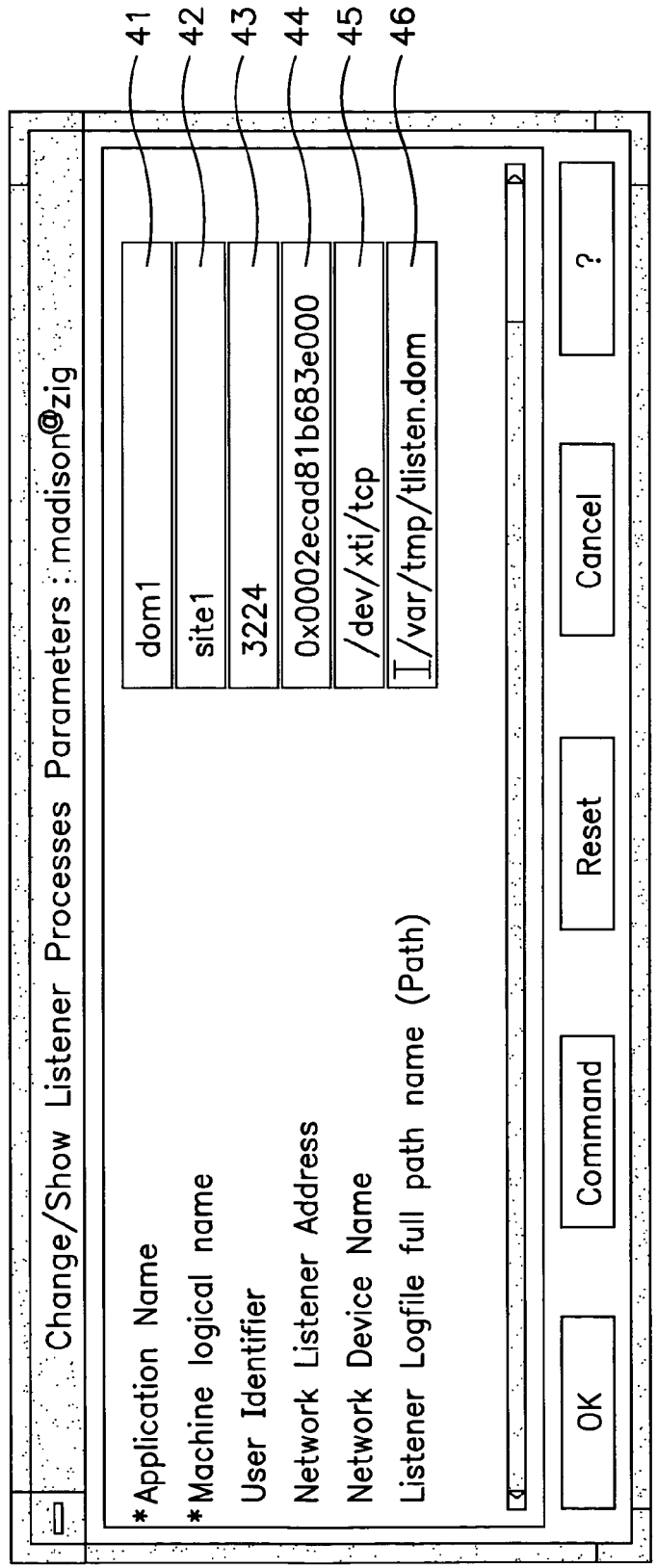
FIG. 4 represents a window of the graphical interface according to claim 1 that makes it possible to display information related to a listener module of a given application.

The network section contains, for each machine:

the complete address used by the bridge process (BRIDGE), called the "Network Address" or "NADDR". The first four digits (0002 in the example of FIG. 4) represent the communication protocol used ("tcp" in the above example). The next four digits represent the port number used by the process and the subsequent digits represent the network address of the machine;

the access path to the bridge (BRIDGE) of the machine. The bridge is a process for managing communications between the servers of the application. It is used to boot up the application. Each machine is provided with a bridge.

the complete address of the listener module, called "NLSADDR". The first four digits represent the communication protocol used. The next four digits represent the port number used by the listener module, which must be different from the one used by the bridge process (BRIDGE). The subsequent digits represent the network address of the machine.

The essential characteristic of the invention is that the information related to the application is extracted directly from the active file of the master machine. An administrator on any machine of the network can control the execution of the command "get_tuxval" in the master machine belonging to the administrator, as represented on page [27] of Appendix 2.

The subroutine "get_tuxconfig" of the program used in the implementation of the process for assisting in the administration of a distributed application searches on the hard disk of the master machine for the active configuration file of the application. The latter is then decompiled by means of the command "tmunloadcf" (Page [28] of Appendix 2), lines 85 through 99.

```
get_tuxconfig( ) {
    if [-s tuxconf.tmp.$appname]
    then
        cat tuxconf.tmp.$appname
    else
        rm -f tuxconf.tmp.*
        prog="$Env"
```

-continued

```
$TUXDIR/bin/tmunloadcf
echo "\nexit $?"
'
#print -r "$prog" > prog
            rsh "$MASTER" -l "$ADMIN" "$prog" | tee tuxconf.
tmp.$appname
    fi
get_tlistenlog
}
```

The subroutine "get_tuxval" of this program (Page [28] of Appendix 2, lines 112 through 183) extracts parameters such as LMID, APPDIR, TUXCONFIG, TUXDIR, ROOTDIR, ULOGPFX, NLSADDR, UID and BRIDGE from the binary configuration file of the application obtained by means of the subroutine "get_tuxconfig".

```
get_tuxval( ) {
    get_tuxconfig | \
    sed -e "s/=/ /g" -e 's/"//g' -e 's/\\\/0/g' | awk'
```

The values of the parameters sought are first initialized. To do this, associative matrices called "tuxconfig_section" are created.

```
BEGIN {
    tuxconfig_section["*RESOURCES"] = 1
    tuxconfig_section["*MACHINES"] = 2
    tuxconfig_section["*GROUPS"] = 3
    tuxconfig_section["*SERVERS"] = 4
    tuxconfig_section["*SERVICES"] = 5
    tuxconfig_section["*ROUTING"] = 6
    tuxconfig_section["*NETWORK"] = 7
```

An index is associated with each matrix. The parameters sought are located in different sections of the configuration file. For example, for the "Tuxedo" application, these different sections, which number seven, are called "Resources," "Machines," "Groups," "Servers," "Services," "Routing" and "Network." In order to be able to extract the parameters that the computer needs, it must be able to mark the place where it is found in the configuration file. In this program, when the field number (NF) is equal to 1, the computer is found at the beginning of a section.

```
NF == 1 {
    if ($1 in tuxconfig_section) {
        section = tuxconfig_section[$1]
        next
    }
}
```

If the computer is in section 2 and the second word is LMID, the computer extracts the logical name of the machine (LMID) on which the administrator is working.

```
section == 2 && $2 == "LMID {# MACHINES section
    if ($3 == machine) {
```

```
        -continued
    printf "uname=%s\n", $1
    mach_found =1
    }
    else {# reset mach_found for further machines
    mach_found = 0
    }
    next
}
```

If the computer is in section 2 and the first word is APPDIR, it extracts the access path to the directory under which the servers a re bootstrapped.

```
section == 2 && $1 == "APPDIR" && mach_found==1 {
         printf "appdir=%s\n", $2
    appdir = $2
    next
         }
```

Proceeding in the same way, the computer will successively extract, in the machines section of the configuration file, the absolute access path to the binary configuration file (TUXCONFIG), the access path to the installation directory of the Tuxedo software (TUXDIR or ROOTDIR), information on the history of the application (ULOGPFX), and in the network section, the address of the bridge of the machine (NLSADDR).

```
section == 2 && $1 =="TUXCONFIG" && mach_found == 1 {
         printf "tuxconfig=%s\n", $2
    next
    }
section == 2 %% $1=="TUXDIR" && mach_found==1{
         printf "tuxdir=%s\n", $2
    next
    }
section == 2 && $1=="ROOTDIR" && mach_found==1 {#for V4
         printf "tuxdir=%s\n", $2
    next
    }
section ==2 && $1=="ULOGPFX" && mach_found==1 {
    ulogpfx=1; printf "ulogpfx=%s\n", $2
    next
    }
section == 7 && NF == 1 {
    if ($1 == machine)
         {mach_found = 1}
    else {#reset mach_found for other machines
         mach_found = 0
         }
    next
    }
section == 7 && $1=="NLSADDR" && mach_found==1 {
         printf "nlsaddr=%s\n", $2
    next
         }
```

The program executes a loop in this subroutine for each machine until the computer finds the current machine. Then, the computer obtains, in the resources section of the configuration file, the identification of the user of the application (UID).

```
section == 1 && $1 == "UID" {printf "uid=%s\n", S2; next }
```

If no value has been defined for the UID in the configuration file, the UID of the person who built the application is used. Next, the computer finds in the network section of the configuration file the access path to the bridge (BRIDGE) of the machine.

```
section == 7 && $1 =="BRIDGE" && mach_found==1 {
```

The parameter ULOGPFX representing the history of the machine is an optional value. When it does not exist, the computer will generate a file called "ULOG" in the directory APPDIR containing information on the manipulations performed on the application.

```
if (ulogpfx == 0) {
    printf "ulogpfx=%s/ULOG\n", appdir }
         } ' machine=$machine appname=$appname
         lang=sed -e "s=/ /g" -e "s/'/ /g" -e "s/;/ /" $ConfDir/
$appname.tux | awk '
         $1 == "LANG" {printf "lang=", $2}'
    }
```

In addition, the computer needs the working language of the application, represented by the parameter LANG, as well as the value "tlog". The parameter LANG is found in the user's configuration file.

```
lang='sed -e "s/=/ /g" -e "s/'//g" -e "s/; /"
$ConfDir/$appname.tux | awk'
         $1 == "LANG" {printf "lang=", $2}''
```

The value "tlog" refers to the file "tlistenlog . <name of the application> . <name of the machine>" containing the name of the history file of the listener module.

In the subroutine get_tuxval, the program has gathered all of the environment variables it needs to be able to start the process for assisting in the administration of a distributed application. This process makes it possible, in addition to starting and stopping one or more listener modules, to display information on one or more listener modules, to change the log of one or more listener modules, to check the script of one or more listener modules, and finally, to update the script of one or more listener modules (FIG. 1).

Figure 2:
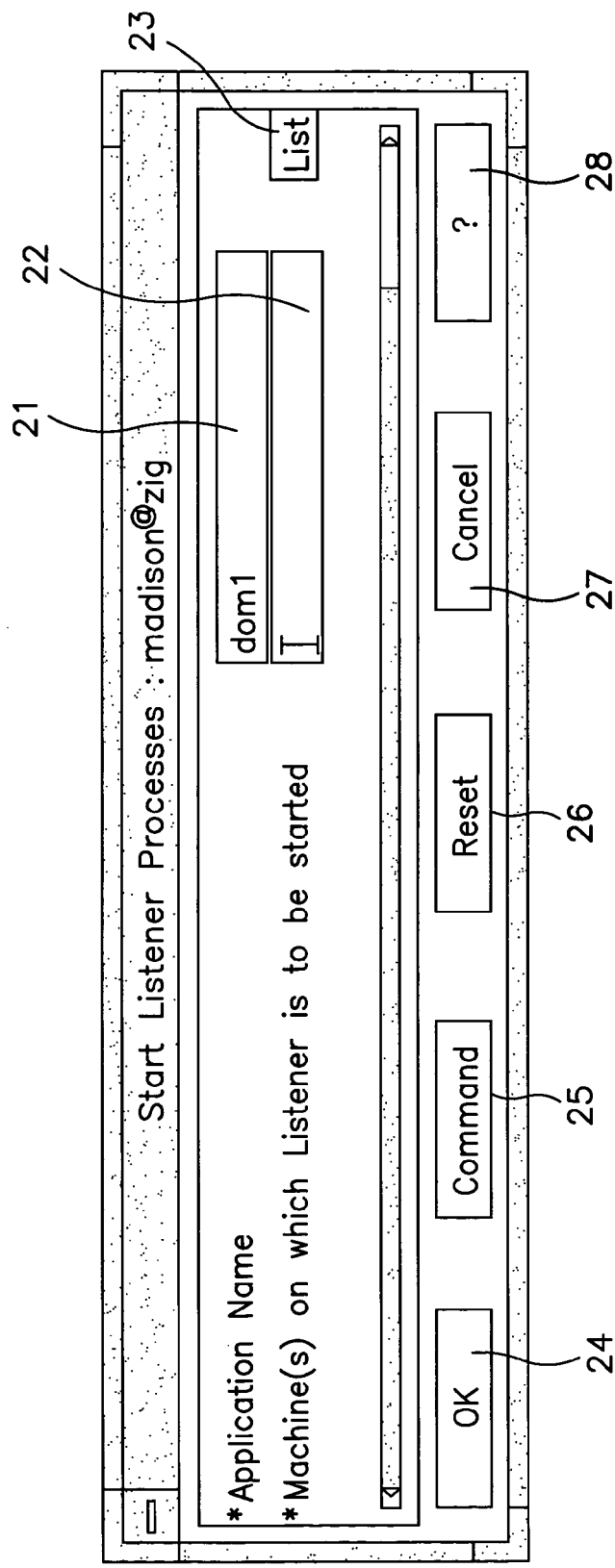
FIG. 2 represents a window of the graphical interface according to FIG. 1 that makes it possible to activate one or more listener modules.

The process for assisting in the administration of a distributed "Tuxedo" application is provided with a graphical interface that allows access to the commands of the transaction processing manager. To execute a task, the administrator is not required to enter commands; he need only click on icons to call up menus and indicate values via dialog boxes. The assisting process is controlled by menus, structured in tre form. The selection of an option in the main menu results in the display of the associated lower level menu. This process is repeated until a pop-up dialog box is displayed, in which the administrator must enter parameter values. In order to be able to manage the listener modules of the distributed "Tuxedo" application, the administrator selects, from the main menu "Tuxedo Commands," the functions "Tuxedo Commands," "Start/Stop Tuxedo Configuration," "Set up a Tuxedo Application" and "Manage the Listener Processes." The selectable functions "Start Listener Processes," "Stop Listener Processes," "Change/Show Listener Process Parameters," "Show currently running Listener Processes," "Check consistency of Listener Process scripts with TUXCONFIG Level" and "Update Listener Process to TUXCONFIG Level" appear in the window of the graphical interface (FIG. 1). To start listener modules, the administrator must select the command "Start Listener Processes" by positioning the cursor of his mouse on the box (11) and pressing on the left button of his mouse. The window of FIG. 2 appears after the selection. If an application has been predesignated, its name is displayed in the box (21). If not, the administrator is informed by the blinking marker of the cursor that he must provide one. To do this, the administrator can either click on the "List" button (23) in order to display the list of the stored applications and select one of them, or explicitly enter the name of the desired application. Next, the administrator is informed by the blinking marker of the cursor in the box (22) that he must indicate the name(s) of the machine(s) in which a listener module must be started. In the same way, the list of the machines comprised in said application can be obtained by clicking on the "List" button (23). In order to validate the machines selected, for example by being highlighted, the administrator must click on the "OK" button (24). The command for starting the listener module is obtained by selecting the "Command" button (25). The "Reset" button (26) makes it possible to reset the values of the boxes (21) and (22). The "?" button (28) offers online help to the administrator.

For each machine designated in the list of machines, the computer obtains information on the application in the configuration file of the master machine, and a history file called "tlistenlog. <name of the application> . <name of the machine>" containing information on the application currently running on this machine. First, the computer checks to see whether the listener module has already been started in the machine. If this is the case, the message "Listener already running on <name of the machine>" is printed on the screen. Otherwise, if a local file exists, the computer executes it and prints the message "Listener started on the machine" if the command succeeds. If the command fails, the computer prints the message "Listener starting failed on <name of the machine>". If the local file does not exist, the computer generates a file "tlistenlog . <name of the application> . <name of the machine>" in the directory APPDIR, executes it, and reports the result as before. This file contains information on the current application and will be used in the next startup of the listener modules. This corresponds to lines 652 through 698 on page [36] and to lines 699 through 719 on page [37] of Appendix 2.

```
startlistproc)
appname=$1; shift
    list ="$*"
    set_environ
    loop_status=0
    exit_status=0
        for machine in $list
        do
            echo "\n------- Machine: $machine -------\n"
            get_tuxval > "appname.tux"
        get_tllog
        ../appname.tux
        prog1="
        TUXDIR=$tuxdir; export TUXDIR
            ROOTDIR=$tuxdir; export ROOTDIR # V4
        APPDIR=$appdir; export APPDIR
        TUXCONFIG=$tuxconfig; export TUXCONFIG
        PATH=${PATH}:\$TUXDIR/bin:\$APPDIR; export PATH
        LANG=$lang; export LANG
```

-continued

```
        LIBPATH=${LIBPATH}:$tuxdir/lib; export LIBPATH
        COLUMNS=200; export COLUMNS
        ps -eF '%u %p %a' | awk'\$3 ~ |"tlisten\" && \$0 ~
\$nlsaddr\" {exit 1}'
        if [\$? = 1]
            then
                echo \"Listener already running on $machine\"
                echo exit 0
                    exit 0
                fi
        if [-f $appdir/tlisten.$appname.$machine]
        then
            . $appdir/tlisten.$appname$machine
                ps -eF '%u %p% a' | awk '\$3 ~ \"listen\" && \$0 ~
\$nlsaddr\" {exit 1}'
                if [\$? = 1]
                then
                    echo \"Listener started on $machine\"
                    echo exit 0
                else
                    echo \"Listener starting failed on $machine!!!\"
                    echo exit 1
                fi
        else # create the script file & exec it
        echo \"$tuxdir/bin/tlisten -d $bridge -1 $nlsaddr -u $uid
-L $tllog\" > $appdir/tlisten.$appname.$machine
            chmod ug+x $appdir/tlisten.$appname.$machine
            .$appdir/tlisten.$appname.$machine
            ps -eF '%u %p %a'|awk'\$3 ~ \"tlisten\" && \$0 ~
\"nlsaddr\" {exit 1}'
                if [\$? =1]
                then
                    echo \"Listener started on $machine\"
                    echo exit 0
                else
                    echo \"Listener starting failed on $machine!!!\"
                    echo exit 1
                fi
        fi"
    #echo "$prog1" > prog1
    if [-z $uname]
        then
            [print "Host $machine not found"
            exit 1
    fi
        rsh $uname" -1 $ADMIN" "$prog1" | awk'
            NR == 1 {line = $0}
            NR > 1 (print line; line = $0 }
            END {if(sub("^exit","  ", line)) exit line; print line;
exit -1}'
        loop_status='expr $loop_status\$?'
        done
            exit $loop _status
    ;;
```

Figure 3:
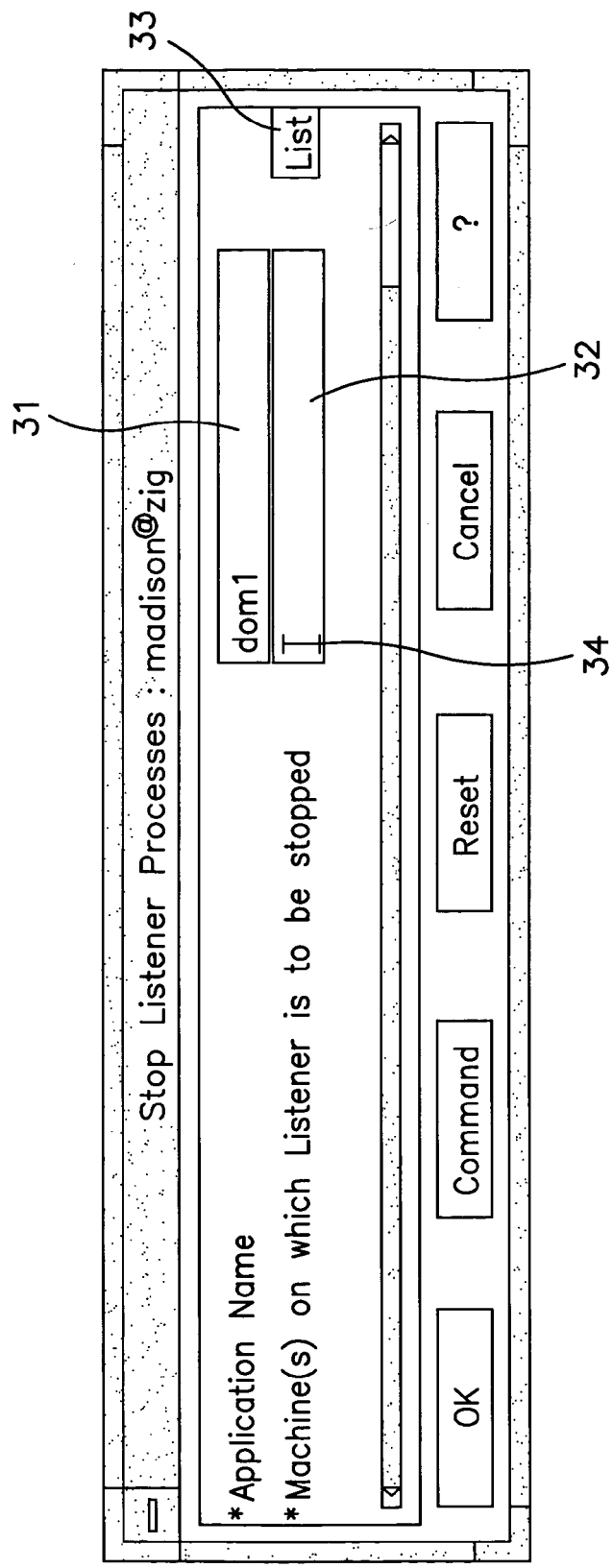
FIG. 3 represents a window of the graphical interface according to FIG. 1 that makes it possible to stop one or more listener modules.

To stop a listener module, the administrator selects, from the main menu for managing listener modules, "Manage the Listener Processes", the function "Stop Listener Processes" by positioning his cursor on the box (12) (FIG. 1). The window of FIG. 3 appears. It makes it possible to indicate, in a first box (31), the name of the application, and in a second box (32), the name of the machine or machines. By clicking on the "List" button (33), a list of the applications stored or a list of the machines related to each application can be obtained depending on the position of the blinking position marker (34). For each machine of the application, the computer prints the name of the machine for which the listener module is stopped. This selection on the screen via the graphical interface starts the program steps "stoplistproc" during which the program obtains information, in the station in which the stop procedure is initiated, using get_tuxval on the application contained in the configuration file of the master machine (Page [37] of Appendix 2, lines 720 through 762).

```
stoplistproc)
    appname=$1; shift
    list ="$*"
    set_environ
    loop_status=0
    exit_status=0
    for machine in $list
        do
        echo "\n ------- Machine: $machine -------\n"
        get_tuxval > "appname.tux"
        ../appname.tux
        prog1="
            COLUMNS=200: export COLUMNS
            ps -eF '%u %p %a' |awk '\$3 ~ \"tlisten\" && $0 ~
\"$nlsaddr\" {print\$2; exit 0} | read pid
            if [-n\"\$pid\"]
            then
                kill -9 \$pid > /dev/null
                status=\$?
                if [\$status -eq 0]
                then
                    echo \"Process \$pid killed on $machine\"
                    echo exit 1
                else
                    echo \"Failed to stop listener on $machine!!!\"
                    echo exit 1
                fi
            else
                echo \"No Listener running on $machine\"
                echo exit 1
            fi"
        if [-z "$uname"]
        then
            print "Host $machine not found"
            exit 1
        fi
        rsh "$uname" -1 "$ADMIN" "$prog1" | awk'
            NR == 1 {line = $0}
            NR > 1 {print line; line = $0 }
            END {if(sub("^exit", " ", line)) exit line; print line;
exit -1}'
        loop_status=`expr $loop_status \|$?`
    done
exit $loop_status
;;
```

If a process called "tlisten" belonging to the current application is running on this machine, the computer kills it and prints the message "Process <process identifier (PID)> killed on <name of the machine>; otherwise it prints the message "Failed to stop listener on <name of the machine>".

Furthermore, this process for assisting in the administration of an application makes it possible to display information related to a listener module. To do this from the main menu for managing listener modules "Manage the Listener Processes," the administrator need only select the function "Change/Show Listener Processes Parameters" in the box (13) of the window presented in FIG. 1. The window of FIG. 4 appears. The administrator must indicate, in the box (41), the name of the application, and in the box (42), a machine name. As a result of this indication, the other boxes (43 through 46) of the window will show the values of parameters such as:

the identification of the administrator (UID), the complete address of the listener module, composed of the address of the machine and the number of the port it is using (NLSADDR), the access path to the network, the full access path to the log file of the listener module (Listener Logfile Full Path Name, LLFPN).

All of this information is extracted from the file TUX-CONFIG of the master machine. This information cannot be changed by this command, with the exception of LLFPN. Appendix 2 presents, on lines 570 through 579 on page [35], the part of the program corresponding to the execution of the command for changing the LLFPN.

```
chglisten)
    appname=$1
    machine=$2
    shift 2
    if [$#-gt 0]
    then
        echo "TLLOG $machine $1" >
$ConfDir/tlistenlog/$appname.$machine
    fi
    exit $?
    ;
    ;
```

In order to be able to display the active listener modules of the application, the administrator must select the function "Show currently running Listener Processes" by clicking on the box (14) of the window of FIG. 1. The computer displays the list of the machines of the application on which a listener module is active and the process identifier (PID) belonging to the configuration of the network. Appendix 2 presents, on lines 764 through 768 on page [37] and on lines 769 through 809 of page [38], the part of the program corresponding to the display of the list of active listener modules, which us s the function get_tuxval.

```
running list)
    appname=$1
    loop_status-0
    set_environ
    list_lmids=`get_tuxconfig|\
    sed -e "s/"//g" -e 's/"//g' -e s/\\\V0/' -e s/\*//" | awk '
        BEGIN { network=0 }
        {line = $0}
            NF == 1 {if (network == 1) print $1}
            $1 == "NETWORK" {network = 1}
            END {if(sub("^exit"," ",line)) exit line; exit -1}'
    for machine in $list_lmids
        do
            get_tuxval > "appname.tux"
            ../appname.tux
            prog1="
            TUXDIR=$tuxdir; export TUXDIR
            LIBPATH=${LIBPATH}:$tuxdir/lib; export LIBPATH
            ROOTDIR=$tuxdir; export ROOTDIR # V4
            APPDIR=$appdir; export APPDIR
            TUXCONFIG=$tuxconfig; export TUXCONFIG
            PATH=${PATH}:\$TUXDIR/bin:\$APPDIR; export PATH
            LANG=$lang; export LANG
            COLUMNS=200; export COLUMNS
            ps -eF '%u %p %a' | awk '\$3 ~ \"tlisten\" && \$0 ~
|"$nlsaddr\" {print \$2}'| read pid
            if [ -n \"\$pid\" ]
            then
                echo \"Listener running on $machine: pid = \$pid\"
                echo exit 0
            else
                echo \"No Listener running on $machine\"
                echo exit 0
            fi"
        if [ -z $uname ]
        then
            print "Host $machine not found"
            exit 1
        fi
        rsh "$uname -1 "$ADMIN" "$prog1" | awk '
            NR == 1 {line = $0}
```

-continued

```
    NR > 1 { print line; line = $0 }
    END { if(sub("^exit"," ", line)) exit line; print line;
exit -1}'
      loop_status=`expr $loop_status\| $?`
   done
   exit $loop_status
   ;;
```

Figure 5:
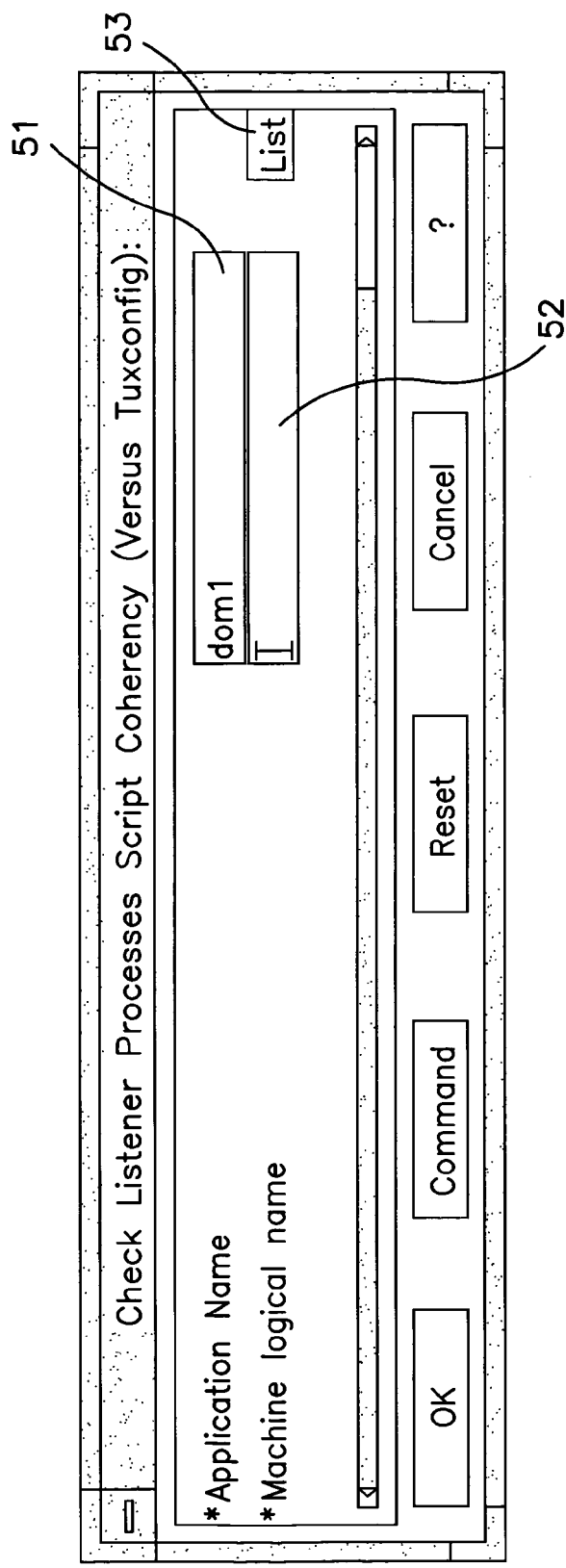
FIG. 5 represents a window of the graphical interface according to claim 1 that makes it possible to check the script of a listener module of a given application.

The administrator can also check the script of a listener module. By selecting the function "Check consistency of Listener Process scripts with Tuxconfig" in the box (15) of the window represented in FIG. 1, the window of FIG. 5 appears. The administrator must enter the name of an application in the box (51) and the name of a given machine in the box (52). A list of the applications and the machines is made available to the administrator by the "List" button (53). The program compares the information contained in the file TUXCONFIG of the master machine and extracted by the function "get_tuxval" with the information contained in the file "tlisten.(name of the application).(name of the machine)" located in the directory APPDIR of the machine and gives the result of this comparison. Appendix 2 presents, on lines 580 through 631 of page [35] and on lines 632 through 651 of page [36], the part of the program corresponding to the checking of a script of a listener module, which makes it possible to indicate the mismatches between the parameters of the files, for example by printing "BRIDGE values mismatch" for the bridge.

```
chklistscript)
      appname=$1
      machine=$2
      set_environ
      get_tuxval > "appname.tux"
      get_tllog
      ../appname.tux
      prog=""
      if [-f $appdir/tlisten.$appname.$machine]
         then
             cat $appdir/tlisten.$appname.$machine
             echo \"\\nexit 0\"
         else
             echo \"\\nexit 1\"
      fi"
      if [-z "$uname"
      then
          print "Host $machine not found"
          exit 1
      fi
      rm -f tlscript.$appname$machine
      rsh $uname" -1 "$ADMIN" "$prog" | tee tlscript.
$appname.$machine > /dev/null
      [$? -ne 0] && exit 1
      [-s tlscript.$appname.$machine] && cat tlscript.
$appname.$machine | \awk'
          END {if ($2 == "1" ) exit -1)'
      [$? -eq -1] && exit 1
      [-s tlscript.$appname.$machine] && cat tlscript.
$appname.$machine|\
         awk '
         $1 ~ "tlisten" {
             mismatch = 0
             fexec=sprintf ("%s/bin/tlisten", tuxdir)
             if ($1 !=fexec){
                 print "tlisten command full pathnames mismatch"
                 printf "\tscript:\t%s\n", $1
                 printf "\tconfig:\t%s\n", fexec
                 mismatch +=1
             }
```

-continued

```
            for (i=2; i <= NF; i++) {
                if (($i == "-d") && ($(i+1) != bridge)){
                    print "BRIDGE values mismatch"
                    printf "\tscript:\t%s\n", $(i+1)
                    printf "\tconfig:\t%s\n", bridge
                    mismatch +=1
                }
                if (($i == "-1") && ($(i+1) !=nlsaddr)){
                    print "NLSADDR values mismatch"
                    printf "\tscript:\t%s\n", $ (i+1)
                    printf "\tconfig:\t%s\n", nlsaddr
                    mismatch +=1
                }
                if (($i == "-u") && ($(i+1) != uid)){
                    print "UID values mismatch"
                    printf "\tscript:\t%s\n", $(i+1)
                    printf "\tconfig:\t%s\n", tllog
                    mismatch +=1
                }
            }}
      END {
          if (mismatch == 0)
              printf "Script File is up-to-date for %s\n",
machine
          else
              print f"\nScript File is NOT up-to-date for
%s\n", machine
              } 'tllog=$tllog machine=$machine bridge=$bridge \
                  nlsaddr=$nlsaddr uid tuxdir=$tuxdir
      exit $?
      ;;
```

Figure 6:
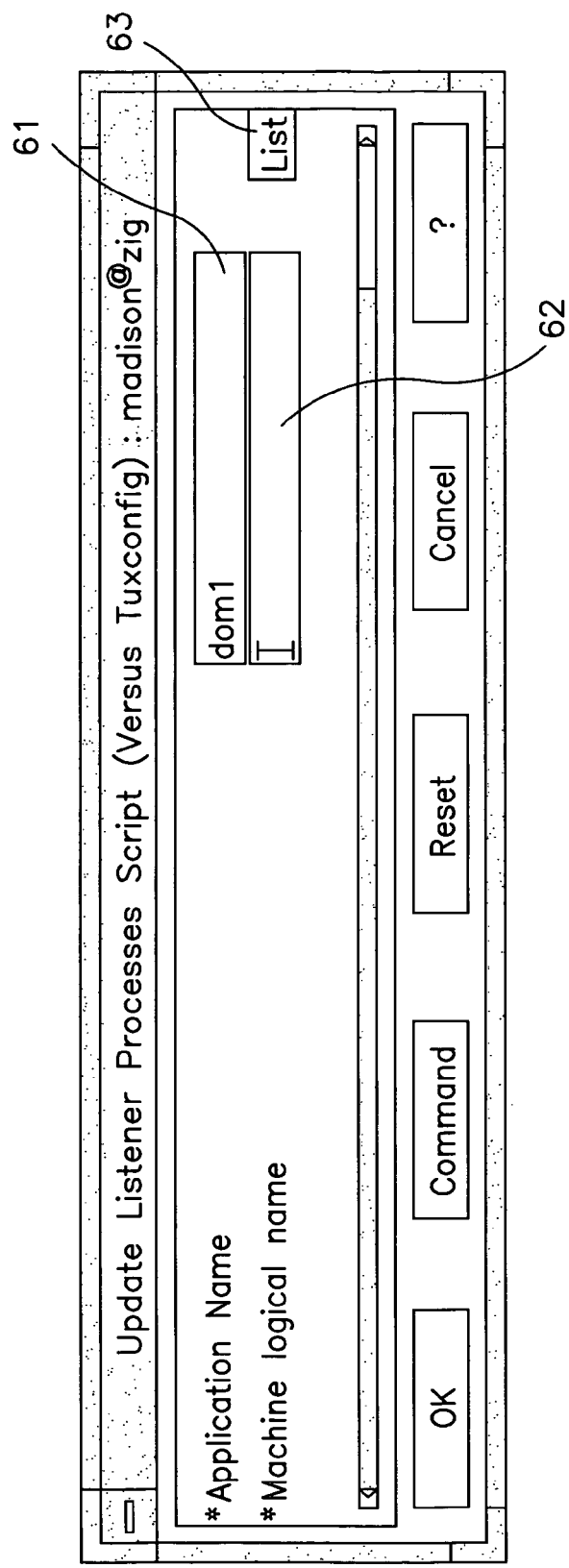
FIG. 6 represents a window of the graphical interface according to claim 1 that makes it possible to update the script of a listener module in a given machine of a given application.
Figure 7:
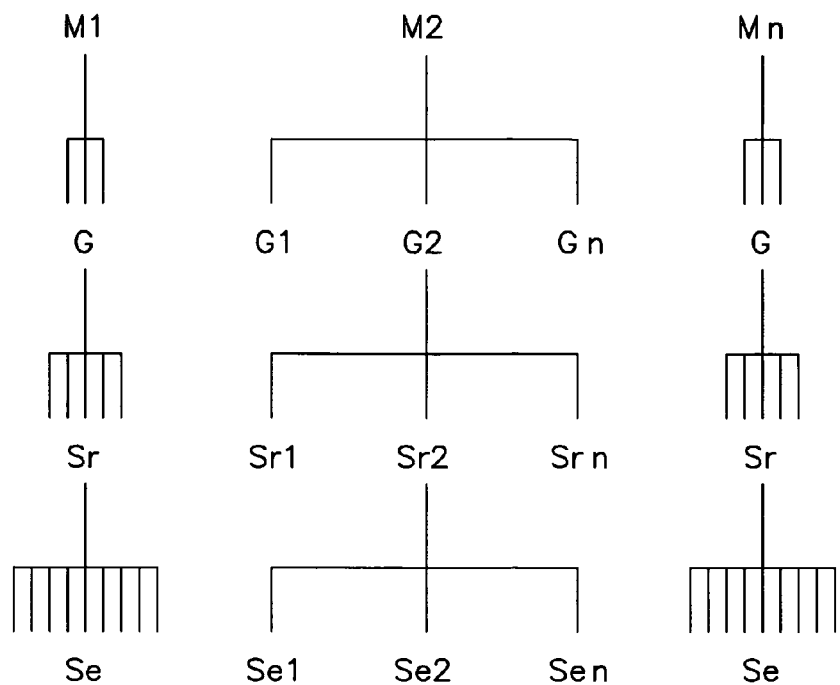
FIG. 7 represents the general structure of a distributed application of a transaction processing manager.
Figure 8:
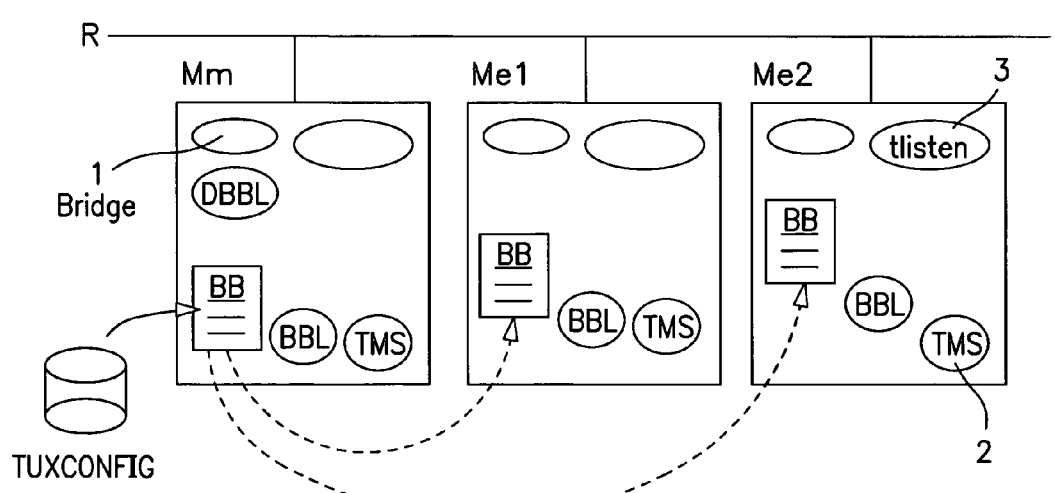
FIG. 8 represents an exemplary application of a transaction processing manager.

A script of a listener module can also be updated by selecting the function "Update Listener Process scripts to TUXCONFIG Level." A script of a Tuxedo listener module makes it possible to start a listener module. It suffices to integrate a script of this type into the startup sequence for a given machine in order for the listening machine to be started automatically at the same time as the machine. In the window represented in FIG. 6, the administrator enters in the box (61) the name of an application, and in the box (62) the name of one or more machines. The program, by calling the subroutine "get_tuxval", obtains all of the information it needs in the binary configuration file extracted by the subroutine "get_tuxconfig" and creates a file corresponding to it in the directory APPDIR under the name "tlisten.(name of the application).(name of the machine). Lines 810 through 831 of Appendix 2, page [38] present the part of the program corresponding to the execution of the command for updating a script of a listener module.

```
updtlistscript)
      appname=$1
      machine =$2
      set_environ
      get_tllog
      get_tuxval > "appname.tux"
      ../appname.tux
      prog=""
echo \"$tuxdir/bin/tlisten -d $bridge -1 $nlsaddr -u $uid -L
$tllog\" >$appdir/tlisten.$appname.$machine
      chmod ug+x $appdir/tlisten.$appname.$machine
      echo exit \$?"
      if [-z "$uname"
      then
          print "Host $machine not found"
          exit 1
      fi
```

-continued

```
rsh "$uname" –1 "$ADMIN" "$prog" | awk '
    NR == 1 {line = $0}
    NR > 1 {print line; line = $0}
    END {if(sub("^exit"," ",line)) exit line; print line; exit
-1}'
    exit $?
;;
```

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

The invention claimed is:

1. An automated process for assisting in the administration of a distributed application of a transaction processing manager, based on a binary configuration file said process comprising:
   decompiling the active configuration file of the master machine,
   retrieving information related to said distributed application from the decompiled configuration file of the master machine,
   checking the consistency of said application running on at least one of several machines, wherein said process is performed by a computer program, and wherein the step for checking the consistency of said application comprises comparing the information obtained from the binary configuration file of the master machine and the information obtained from said current application running on a given machine;
   managing at least one listener module of any machine from another machine, wherein the managing is capable of starting or stopping one or more of the listener modules based on the binary configuration file and activating the one or more listener modules, wherein the distributed application is started after the starting of the one or more listener modules and the at least one listener module receives information from another machine; and
   automatically generating a file containing information on said application running on a given machine when the file does not exist in the given machine in order to be able use it during a next startup of the listener modules.

2. A process according to claim 1, further comprising extracting directly from an active configuration file of the master machine information related to said distributed application.

3. A process according to claim 1, wherein said administration of listener modules consists of comprises starting and stopping at least one listener module, displaying information related to at least one listener module, changing a log of at least one listener module, checking a script of at least one listener module and/or updating the script of at least one listener module.

4. A process according to claim 1, further comprising a step for starting and stopping a listener module running on a first machine, said step for starting and stopping being carried out by an administrator using a second machine distinct from the first machine, but belonging to the same network as the first machine.

5. A process according to claim 1, further comprising a step for simultaneously activating several listener modules.

6. A process according to claim 1, further comprising a step for decompiling an active configuration file of the master machine.

7. A process according to claim 1, including a graphical interface comprising at least one icon, at least one menu and at least one dialog box for implementing a start and stop of a listener module and a retrieval of information and checking the consistency of said application running on a given machine.

8. A process according to claim 1, wherein information related to at least one listener module is displayed and comprises at least a name of said application, a logical name of the machine on which said application is run, an identification of a user of said application, an address used by the listener module, an access path to the network of said application, and an access path to a log file of said listener module.

9. A process according to claim 3, wherein information related to at least one listener module is displayed and comprises at least a name of said application, a logical name of the machine on which said application is run, an identification of a user of said application, an address used by the listener module (NLSADDR), an access path to the network of said application, and an access path to a log file of said listener module.

10. A process according to claim 4, wherein information related to at least one listener module is displayed and comprises at least a name of said application, a logical name of the machine on which said application is run, an identification of a user of said application, an address used by the listener module, an access path to the network of said application, and an access path to a log file of said listener module.

11. A process according to claim 5, wherein information related to at least one listener module is displayed and comprises at least a name of said application, a logical name of the machine on which said application is run, an identification of a user of said application, an address used by the listener module, an access path to the network of said application, and an access path to a log file of said listener module.

12. A process according to claim 7, wherein the at least one menu of the graphical interface is structured in tree form and activation of a menu results in a display of a list of values of a current configuration, selectable by a user.

13. A process according to claim 7, wherein information related to at least one listener module is displayed and comprises at least a name of said application, a logical name of the machine on which said application is run, an identification of a user of said application, an address used by the listener module, an access path to the network of said application, and an access path to a log file of said listener module.

14. A process according to claim 12, wherein information related to at least one listener module is displayed and comprises at least a name of said application, a logical name of the machine on which said application is run, an identification of the user of said application, an address used by the listener module, an access path to the network of said application, and an access path to a log file of said listener module.

15. A process according to claim 13, wherein information related to at least one listener module is displayed and comprises at least a name of said application, a logical name of the machine on which said application is run, an identification of a user of said application, an address used by the listener module, an access path to the network of said application, and an access path to a log file of said listener module.

* * * * *

UNITED STATES PATENT AND TRADEMARK OFFICE
CERTIFICATE OF CORRECTION

| | |
|---|---|
| PATENT NO. | : 7,020,677 B1 |
| APPLICATION NO. | : 09/380250 |
| DATED | : March 28, 2006 |
| INVENTOR(S) | : Baillif, Christian and Dia, Mama Saidou |

It is certified that error appears in the above-identified patent and that said Letters Patent is hereby corrected as shown below:

In claim 15, Column 17, Line 1, replace "13" with --1--.

Signed and Sealed this

Eighteenth Day of July, 2006

JON W. DUDAS
*Director of the United States Patent and Trademark Office*